Figure 1:
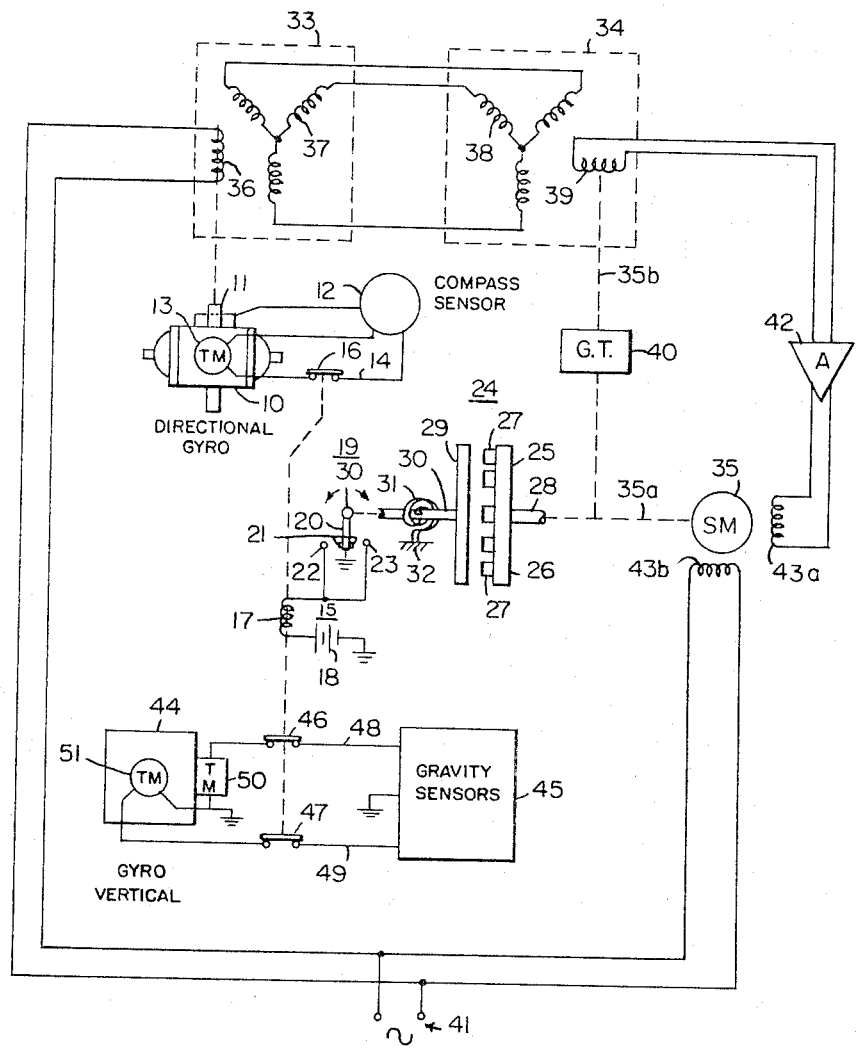

INVENTOR.
HAROLD S. WHITEHEAD
ATTORNEY

United States Patent Office 3,276,269
Patented Oct. 4, 1966

3,276,269
CONNECTION CUT-OFF SYSTEM FOR
GYROSCOPIC DEVICES
Harold S. Whitehead, Marblehead, Mass., assignor to
General Electric Company, a corporation of New York
Filed Mar. 31, 1964, Ser. No. 356,227
8 Claims. (Cl. 74—5.4)

The present invention relates to gyroscopic devices and more particularly to gyroscopic sensors used to detect the heading and attitude of movable craft.

Gyroscopic sensors are widely used on movable craft such as airplanes, submarines, spacecraft, etc., to indicate the heading and attitude of the craft in space. Sensors comprising two-axis gyros used to detect heading of the craft are commonly referred to as directional gyros, and those used to detect attitude of the craft with respect to longitudinal and lateral axes thereof are commonly called gyro verticals or horizon gyros. Both types depend for their action on the fact that the universally mounted spinning gyro rotor tends to maintain the orientation of its spin axis in space. However, due to a variety of causes, the gyro tends slowly to drift away from its initial setting and so must be corrected or slaved to a fixed reference. Thus, it is common to slave the directional gyro to a magnetic compass which senses the magnetic axis of the earth and to slave the gyro vertical to pendulums or other devices that sense the direction of gravity. Under steady states conditions the compass and pendulum provide accurate references for correcting the gyroscope. However, the compass and pendulum are affected by acceleration forces and do not provide accurate directional references when the craft is subject to acceleration as during a turn of the movable craft on which they are mounted. If the turn acceleration persists beyond acceptable limits of magnitude and duration, the compass and pendulum correction devices must be disconnected or disabled during the turn of the craft to prevent serious error of the gyro sensors.

To avoid the effect of turn acceleration, it has been known heretofore to utilize an additional restrained single-axis gyro, known as a rate gyro, to sense the rate of turn of the craft and to disconnect the gyro correction devices. Rate gyros are, however, expensive, complicated, and not always completely reliable in their operation.

Accordingly, it is an object of this invention to provide a correction cut-off system for gyroscopic attitude and direction sensors that does not require the use of a rate gyro.

Another object of the invention is to provide a correction cut-off system for gyroscopic sensors that is relatively simple, easily adjusted, inexpensive, and very reliable in operation.

Further objects and advantages of the invention will become apparent as the following description proceeds.

Briefly, in accordance with one aspect of the invention, the gyro correction apparatus is disabled during turns of the movable craft on which it is mounted by means of a rotary switch driven by an eddy current device. The eddy current device comprises a rotary magnet member which actuates a spring-biased drag member located in inductive relation therewith which, in turn, actuates the switch. The rotary magnet member is driven by a servomotor forming part of a system for repeating the azimuth position of the directional gyro relative to the craft with force amplification and speed multiplication so that the rotary magnet member is driven at a speed proportional to, and preferably greater than, the rate of turn of the movable craft. This causes actuation of the cut-off switch to disable the gyro correction device when the rate of turn of the craft exceeds a predetermined value. The rate of turn response to the cut-off switch may be conveniently varied by adjusting the spacing of the fixed contacts of the switch since the degree of deflection of the spring-biased eddy current switch actuator is proportional to rate of turn of the craft.

Figure 2:
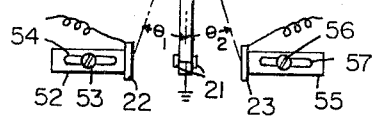

For a better understanding of the invention, reference should be made to the following detailed description taken in connection with the accompanying drawing in which:

FIGURE 1 illustrates in schematic form a correction cut-off system for gyroscopic apparatus embodying the present invention; and FIGURE 2 shows certain details of the cut-off switch forming a part of the system shown in FIGURE 1.

Referring now to FIGURE 1 of the drawing, there is shown a gyroscopic sensor in the form of a directional gyro 10 of a known type commonly used on movable craft for the purpose of indicating the heading or azimuth orientation of the craft. The directional gyro has an output shaft 11 which is stabilized with reference to the turn axis of the craft by gyroscopic action, the shaft being ordinarily coupled to other devices, not shown, for indication or control purposes, or both. Because the directional gyro is subject to long-period drift due to bearing friction, earth rotation, and other factors, the gyroscope is continuously corrected or slaved to a compass sensor 12 which senses the direction of the magnetic axis of the earth. The illustration of the compass sensor 12 is schematic since these devices are well known in the art and form no part of the present invention. The sensor and the related gyro control system may, for example, be of the type described in my Patent 2,924,023. The compass sensor and gyro control system continuously compare the position of the compass relative to the output shaft 11 of the directional gyro, and any deviation of the gyro shaft 11 as measured by the compass produces an electrical control signal which is applied to a torque motor 13 on the gyro through a control circuit 14. The torque motor 13 applies a torque about the minor axis of the directional gyro 10 causing the shaft 11 to rotate by gyroscopic precession until it moves into correspondence with a magnetic heading detected by the compass sensor 12.

Because the compass sensor is affected by acceleration caused by turning of the craft about its azimuth axis, it is necessary to provide means for disabling the compass sensor during turns, and this may be accomplished, for example, by means for opening the control circuit 14 when the rate of turn of the craft exceeds a predetermined value.

According to the invention, a new and improved arrangement is provided for sensing the rate of turn of the craft and disconnecting the compass sensor when the rate of turn exceeds predetermined limits. The means by which this is accomplished will now be described.

An electroresponsive device in the form of a relay 15 is provided having a set of normally closed contacts 16 located in the control circuit 14 interconnecting the compass sensor 12 with the torque motor 13 of the directional gyro. The relay 15 has a coil 17 energized from a suitable electrical source such as a battery 18 through contacts of a cut-off switch 19. The cut-off switch has a rotatable switch arm 20 carrying a set of electrically connected contacts 21 arranged to engage spaced, fixed contacts 22 and 23, respectively, when the switch arm 20 is rotated clockwise or counterclockwise from the center or neutral position shown in the drawing. Engagement of rotating contacts 21 with either stationary contact 22 or 23 completes the energizing circuit of the relay coil 17 causing the relay to pick up and open contacts 16 which disconnects the compass sensor 12.

An arrangement is provided for driving the rotary contacts 21 of the cut-off switch 19 to either the clockwise or counterclockwise closed positions when the rate of turn of the craft on which the directional gyro 10 is mounted exceeds a predetermined value. For this purpose there is provided an eddy current actuating device 24, the construction of which is similar to that commonly used in tachometer indicators of the drag disk type. One such device, for example, is shown in Patent 2,828,955. The eddy current device has a rotating magnet member 25 comprising a rotary disk 26 carrying about its periphery a plurality of laterally projecting permanent magnets 27 which create permanent magnetic fields in the area adjacent to the extremities of the permanent magnets. The disk 26 is carried on a shaft 28 rotatably supported on suitable bearings, not shown. An eddy current drag member in the form of a disk 29 is carried on a rotatable shaft 30 supported on suitable bearings, not shown, so that the axis of shaft 30 is collinear with the axis of shaft 28. The disk 29 is formed of an electrically conductive material such as aluminum and is disposed in inductive relation with the field produced by magnets 27. As will be well understood by those skilled in the art, rotation of the magnet member 25 causes eddy currents to be induced in the disk 29 which produce magnetic fields reacting with the magnetic fields produced by the magnets 27 in such a manner as to cause a drag torque to be exerted on the disk 29. The direction of the torque depends on the direction of rotation of the magnet member 25, and the magnitude of the torque depends on the speed of rotation of the magnet member. A suitable resilient restraining means, which may, for example, be in the form of a spiral spring 31, is used to bias the disk 29 to a center position. One end of the spring is mounted to stationary support 32 and the other inner end is connected to shaft 30. The switch arm 20 of the cut-off switch is rigidly connected to the disk shaft 30 so that when the disk is in the center position the rotary switch arm 20 is also in the center position shown in the drawing. With this arrangement a rotary movement of the magnet member 25 in one direction at sufficient velocity will cause the drag disk 29 to be deflected against the force of restraining spring 31 causing the rotary switch arm 20 of the cut-off switch 19 to move counterclockwise into engagement with the fixed contact 22. Similarly, rotation of the magnet member 20 at a sufficient velocity in the reverse direction will cause the switch arm 20 to move clockwise into engagement with the fixed contact 23. It will now be clear that by providing an arrangement for driving the magnet disk 25 at a speed proportional to the rate of turn of the craft, the cut-off switch 19 will be actuated to disconnect the compass sensor through operation of the relay 15 and the opening of contacts 16. The way in which the magnet member 25 is made to rotate in a direction and at a speed proportional to the directional rate of turn of the craft will now be described.

Since the shaft 11 of the directional gyro 10 is stabilized with respect to the turning or azimuth axis of the craft, it will be apparent that the rate of movement of the shaft 11 relative to its support will correspond to the rate of turn of the craft and the direction of rotation of the shaft will correspond to the directional turn of the craft. It is not feasible, however, to drive the rotary magnet member 25 directly from the shaft 11 of the directional gyro because the rotation of the shaft 11 is not fast enough for operation of the eddy current device, and further it is undesirable to apply any substantial torque to the gyro shaft because the torque will cause precession of the gyro with resulting error. To avoid these difficulties, the rotary movement of the shaft 11 is reproduced with force amplification and speed multiplication by the use of a conventional servomotor-powered follow-up system. As shown, this system may comprise electrically interconnected selsyn transmitter and receiver units 33 and 34 and a servomotor 35 for driving the receiver unit. The selsyn transmitter 33 has a rotor provided with a rotor winding 36 connected to be driven by the gyro shaft 11. It also has a polyphase stator winding 37 electrically connected back-to-back to a corresponding polyphase stator winding 38 of the receiver selsyn. The receiver selsyn, which is sometimes called a control transformer, has a rotor carrying a winding 39, the rotor being driven by the servomotor 35 through a reduction gear train 40 by interconnecting shafts 35a and 35b. The rotor winding 36 of the transmitter selsyn is energized from a suitable source of alternating current supplied to terminals 41, and, when energized, a pattern of voltages appears in windings 37 and 38 which vary with the angular position of the selsyn transmitter winding 36 relative to the stator winding. The resulting voltage induced in the receiver winding 39 has a polarity determined by the relative angular positions of the windings 36 and 39, the voltage being zero at a null position in which these windings are in angular correspondence as is well understood. The voltage output of the receiver winding 39 is amplified by a suitable amplifier 42 and supplied to a control phase winding 43a of the two-phase servomotor 35. A fixed phase winding 43b of the servomotor is connected to be energized from the same alternating current source 41 used to energize the selsyn transmitter 33. With this arrangement the servomotor drives the rotor of the receiver selsyn 34 through the gear reduction 40 continuously to the null position with force amplification, the reflected impedance of the selsyn system being sufficiently high so that no appreciable reactive torque is exerted on the output shaft 11 on the directional gyro.

As shown in the drawing, the servomotor shaft 35a is directly coupled to the shaft 28 of the rotary magnet member 25 so that the magnet member rotates at the same speed as the servomotor. Since the servomotor drives the rotor of the receiver selsyn continuously into correspondence with the position of the rotor of the transmitter selsyn and the connected gyro shaft 11, the speed of the shaft 35b interconnecting the gear train 40 with the rotor of the receiver selsyn will be the same as the speed of rotation of the craft about its azimuth axis. The speed of the shaft 35a on the servomotor side of the gear train will be greater than the speed of shaft 35b being multiplied by a factor equal to the gear ratio of the reduction gear train. Thus, it will be apparent that the servomotor 35 and the connected rotary magnet member 25 will rotate at a speed which is proportional to, but greater than, the rate of turn of the craft. Thus, if the craft on which the apparatus is mounted turns about its azimuth axis at a rate of 90 degrees per minute and the gear train 40 has a ratio of, say, 1000 to 1, the servomotor 35 and the rotary magnet member 25 will be rotating at a speed of 250 r.p.m. Such a speed is adequate for operating an eddy current device of reasonable proportions used to actuate the cut-off switch 19. Depending on the type and speed of the craft, other gear ratios may be more appropriate.

The operation of the gyro cut-off system forming the present invention may now be described as follows:

When the craft upon which the gyroscopic equipment is mounted is proceeding in a straight line under steady state conditions, the shaft 11 of the directional gyro 10 will be stationary as will be the servomotor 35 since winding 39 will be in a null or zero voltage position. Magnet disk 25 will be stationary and the drag disk 29 retained in its center position by spring 31 in which the switch arm 20 of the cut-off switch 19 is in the open center position shown. Relay 15 will be de-energized so that contacts 16 are closed connecting the compass sensor 12 to the directional gyro 10 for normal correction. If the craft now turns in one direction, say clockwise, the servomotor 35 will continuously drive the rotor of the receiver selsyn to follow the movement of the transmitter selsyn and gyro shaft 11, and this will cause a rotation of the magnet member 25, a deflection of the drag disk 29, and a rotation of the switch arm 20 of the cut-off switch 19 in a clockwise direction. If the rate of turn exceeds a predetermined value for which the cut-off switch is set, switch arm 20 will move sufficiently to cause engagement of contacts 21 with fixed contact 22. This causes relay 15 to pick up opening contacts 16 disabling the compass sensor. Similarly, if the rotation of the craft is in the counterclockwise direction, the rotational movements described above will be reversed, causing the arm 20 of the cut-off switch 19 to engage the other fixed contact 23 which will also cause relay 15 to pick up and disable the compass sensor. For rates of turn less than the predetermined value for which the cut-off switch 19 has been set, the torque induced in the drag disk 29 will not be sufficient to cause the rotary switch arm 20 of switch 19 to deflect far enough to engage either of the stationary contacts 22 and 23 so that for this condition the compass sensor will not be disabled. One of the advantages of the present invention is that the cut-off switch may be conveniently adjusted to close at the desired rate of turn by simply varying the spacing of the fixed contacts 22 and 23 relative to the switch arm 20.

One way to provide conveniently adjustable means for varying the spacing of the switch contacts 22 and 23 relative to the switch arm 20 carrying the common contacts 21 is shown in FIGURE 2 of the drawing. The contact 22 is carried on the end of an adjustable arm 52 which may be adjusted laterally relative to contacts 21 by releasing set screw 53 riding in an elongated slot 54. Similarly, contact 23 is carried on the end of an adjustable arm 55 which also may be adjusted laterally relative to contacts 21 by releasing set screw 56 riding in an elongated slot 57. It will be understood that the set screws are threaded into stationary supporting means, not shown, and that the arms 52 and 55 are formed of an electrically insulating material to avoid shorting the contacts 22 and 23. The rotary movement of the switch arm 20 from the center position shown to cause engagement of movable contacts 21 with either of the stationary contacts 22 and 23 is indicated on FIGURE 2 of the drawing by the angles $\theta_1$ and $\theta_2$. Preferably, the arms 52 and 55 are adjusted to make the angles $\theta_1$ and $\theta_2$ equal so that the contacts of the rotary switch will close for the same rate of turn of the craft in either direction. By increasing the angles $\theta_1$ and $\theta_2$ the rate of turn of the craft required to close the rotary switch may be increased and vice versa.

In many installations of gyroscopic devices on movable craft, a selsyn follow-up system similar to that described above for reproducing the position of the output shaft of the directional gyro with force amplification is already installed, being used for remote indication or control purposes. In such cases the only additional elements required to be added to this system to practice the present invention are the eddy current switch actuator 24, the rotary switch 19, and the relay 15 along with a suitable arrangement for coupling the rotary magnet member 25 to the servomotor output shaft. Since these added elements are relatively inexpensive, and automatic control for the gyro correction apparatus is obtained at low cost as compared with the addition of a rate gyro.

Many typical installations also include a gyro vertical 44 slaved to the direction of gravity by gravity sensors 45 which are also affected by turn acceleration and should be disconnected during turns of the movable craft to avoid gyro error. This may be easily accomplished using the cut-off system of the present invention by the addition of normally closed contacts 46 and 47 actuated by relay 15 inserted in control circuits 48 and 49 energizing torque motors 50 and 51 used to erect the gyro vertical.

While there have been described what are at present considered to be the preferred embodiments of the invention, it will be apparent to those skilled in the art that various changes and modifications may be made therein without departing from the spirit or scope of the invention.

What I claim as new and desire to secure by Letters Patent of the United States is:

1. In a correction cut-off system for gyroscopic apparatus carried on a movable craft having a gyroscope with an output shaft stabilized with respect to movements of said craft about a control axis thereof and correction apparatus for slaving said gyroscope to a reference direction, means for disabling said correction apparatus to avoid acceleration errors when the rate of turn of said craft about said control axis exceeds a predetermined value, said disabling means comprising:

a rotatable magnet member, servomotor-driven follow-up means controlled by said gyroscope for driving said magnet member at a speed proportional to the rate of turn of said craft about said control axis and in a direction dependent on the direction of turn of said craft about said axis, an eddy current drag member rotatably mounted in an inductive relation with said magnet member whereby said drag member experiences a torque variable in magnitude and direction in accordance with the speed and direction of rotation of said magnet member, resilient restraining means biasing said drag member to a center position, a cut-off switch having a pair of spaced, fixed contacts and a movable contact connected to be driven into engagement with said fixed contacts by said drag member whereby the contacts of said cut-off switch are closed when the rate of turn of said craft about said control axis exceeds a predetermined value in either direction, and electroresponsive means controlled by said cut-off switch for disabling said correction apparatus.

2. In a correction cut-off system for gyroscopic apparatus as set forth in claim 1, means for adjusting the spacing of the fixed contacts of the cut-off switch relative to the center position of the movable contact to adjust the rate of turn of the craft required to cause closure of the contacts of the cut-off switch.

3. In a correction cut-off system for a directional gyro carried on a movable craft having an output shaft stabilized with respect to movements of said craft about a turn axis thereof and correction apparatus for slaving the directional gyro to a magnetic compass subject to acceleration error, means for disabling said correction apparatus to avoid acceleration error when the rate of turn of said craft about said control axis exceeds a predetermined value, said disabling means comprising:

a rotatable magnet member, servomotor-driven follow-up means controlled by said gyroscope for driving said magnetic member at a speed proportional to the rate of turn of said craft about said turn axis and in a direction dependent on the direction of turn of said craft about said axis, an eddy current drag member rotatably mounted in an inductive relation with said magnet member whereby said drag member experiences a torque variable in magnitude and direction in accordance with the speed and direction of rotation of said magnet member, resilient restraining means biasing said drag member to a center position, a cut-off switch having a pair of spaced, fixed contacts and a movable contact connected to be driven into engagement with said fixed contacts by said drag member whereby the contacts of said cut-off switch are closed when the rate of turn of said craft about said control axis exceeds a predetermined value in either direction, and electroresponsive means controlled by said cut-off switch for disabling said correction apparatus.

4. A correction cut-off system for a gyroscopic device carried on a movable craft and having correction apparatus for slaving said device to a reference direction comprising:

a rotatable magnet member, means for driving said magnet member at a speed proportional to the rate of turn of said craft about an axis thereof in a direction dependent upon the direction of turn of said craft about said axis, a rotatable eddy current drag member disposed in inductive relation with said magnet member whereby said drag member experiences a torque variable in magnitude and direction in accordance with the speed and direction of rotation of said magnet member, resilient restraining means biasing said drag member to a center position, a cut-off switch having a rotary contact driven by said drag member into engagement with spaced, fixed contacts located on opposite sides of the movable contact, an electroresponsive means controlled by said cut-off switch for disabling said correction apparatus.

5. A correction cut-off system for gyroscopic devices as set forth in claim 4 including means for adjusting the spacing of the fixed contacts of the cut-off switch to vary the rate of turn response of said switch.

6. A system for controlling correction apparatus used to slave a gyroscope carried on a movable craft to a reference direction comprising:

an angular motion transmisison system comprising a transmitter unit driven by an output shaft of said gyroscope stabilized with respect to an axis of said craft and a receiver unit driven by a servomotor through a reduction gear train into angular correspondence with said gyroscope output shaft, a rotatable magnet member connected to be driven by said servomotor at a speed greater than, but proportional to, the rate of turn of said craft about said axis and in a direction dependent upon the rate of turn of said craft about said axis, a rotatable eddy current drag member disposed in inductive relation with said magnet member whereby said drag member experiences a torque variable in magnitude and direction in accordance with the speed and direction of rotation of said magnet member, resilient restraining means biasing said drag member to a center position, a cut-off switch having a rotary contact driven by said drag member into engagement with spaced, fixed contacts located on opposite sides of the movable contact, and electroresponsive means controlled by said cut-off switch for disabling said correction apparatus.

7. A gyroscope correction control system comprising:

a directional gyroscope adapted to be mounted on a movable craft and having an output shaft stabilized with respect to movements of said craft about a turn axis thereof, means comprising a compass-controlled torque motor for precessing said gyroscope so that said output shaft is corrected to a magnetic heading, an angular motion transmission system comprising a transmitter unit having a rotor driven by said gyroscope output shaft and a receiver unit having a rotor continuously driven by a servomotor through a reduction gear train into a position of angular correspondence with said gyroscope output shaft whereby said receiver unit rotor rotates at a speed corresponding to the rate of turn of said craft about said turn axis, a rotatable magnet member connected to said servomotor so as to be driven at a speed greater than, but proportional to, the rotor speed of the receiver unit, a rotatable eddy current drag member disposed in inductive relation with said magnet member with its axis of rotation in collinear relation with the axis of rotation of said magnet member, means biasing said drag member to a center position, a cut-off switch having a rotary contact connected to be driven by said drag member into engagement with either of two spaced, fixed contacts against a restraining force of said biasing means depending on the rate and direction of turn of said craft, and means controlled by said cut-off switch for disabling said torque motor.

8. A gyroscope correction control system as set forth in claim 7 including means for adjusting the spacing of the fixed contacts of the cut-off switch to vary the rate of turn response of said switch.

References Cited by the Examiner

UNITED STATES PATENTS

| | | | |
|---|---|---|---|
| 2,383,409 | 8/1945 | Newell | 74—5.4 |
| 2,699,681 | 1/1955 | Johnson | 74—5.41 |
| 2,906,127 | 9/1959 | Burden et al. | 74—5.4 |

FRED C. MATTERN, JR., *Primary Examiner.*

BROUGHTON G. DURHAM, *Examiner.*

PALMER W. SULLIVAN, T. W. SHEAR,
*Assistant Examiners.*